United States Patent
Mayfield (12)

(10) Patent No.: US 11,458,667 B1
(45) Date of Patent: Oct. 4, 2022

(54) POST MOLD MANUFACTURING CONTAINER HAVING AN INTEGRAL COLLAPSIBLE SPOUT

(71) Applicant: Todd A. Mayfield, Suwanee, GA (US)

(72) Inventor: Todd A. Mayfield, Suwanee, GA (US)

( * ) Notice: Subject to any disclaimer, the term of this patent is extended or adjusted under 35 U.S.C. 154(b) by 980 days.

(21) Appl. No.: 15/953,467

(22) Filed: Apr. 15, 2018

(51) Int. Cl.
| | | |
|---|---|---|
| *B29C 49/74* | (2006.01) | |
| *B29C 49/42* | (2006.01) | |
| *B29C 49/80* | (2006.01) | |
| *B65D 25/44* | (2006.01) | |
| *B29L 31/00* | (2006.01) | |

(52) U.S. Cl.
CPC .......... *B29C 49/74* (2013.01); *B29C 49/4273* (2013.01); *B29C 49/80* (2013.01); *B65D 25/44* (2013.01); *B29L 2031/712* (2013.01)

(58) Field of Classification Search
CPC ..... B29C 49/72; B29C 49/74; B29C 49/4273; B29C 49/80; B29C 53/30; B65D 25/44; B65D 25/46; B29D 15/06; B29D 23/18
See application file for complete search history.

(56) References Cited

U.S. PATENT DOCUMENTS

| | | | | |
|---|---|---|---|---|
| 2,272,704 A | * | 2/1942 | Harding | B29D 23/18 264/507 |
| 3,402,429 A | * | 9/1968 | Davidson | B29C 49/28 425/529 |
| 3,716,910 A | * | 2/1973 | Eggert | B07C 5/3408 29/563 |
| 4,529,108 A | * | 7/1985 | Chlystun | B29C 57/00 220/608 |
| 5,606,129 A | * | 2/1997 | Lehmann | G01N 21/9009 250/223 B |
| 6,270,715 B1 | * | 8/2001 | Mayfield | B29C 49/48 222/530 |
| 7,255,826 B2 | | 8/2007 | Lee | |
| 9,533,796 B2 | | 1/2017 | Selina et al. | |
| 9,533,801 B2 | | 1/2017 | Selina et al. | |

FOREIGN PATENT DOCUMENTS

CN            106346753 A   *   1/2017

OTHER PUBLICATIONS

CN106346753A-MT (Year: 2017).*

* cited by examiner

*Primary Examiner* — Yunju Kim

(57) ABSTRACT

A method of post mold manufacturing a container having an integral collapsible spout molded in an extended position with flashing surrounding the integral collapsible spout. An outflow transporting means is moving the container from a blow molding machine to a trimming finishing station where flashing is removed and the container trimmed to specifications. The container is then transported to a spout collapsing station with integral collapsible spout in the molded extended position where it is compressed to a fully collapsed position. This process is completed while the material used in molding the integral collapsible spout is thermally pliable, permitting the integral collapsible spout to be transformed from the molded extended position, to the fully collapsed position.

6 Claims, 12 Drawing Sheets

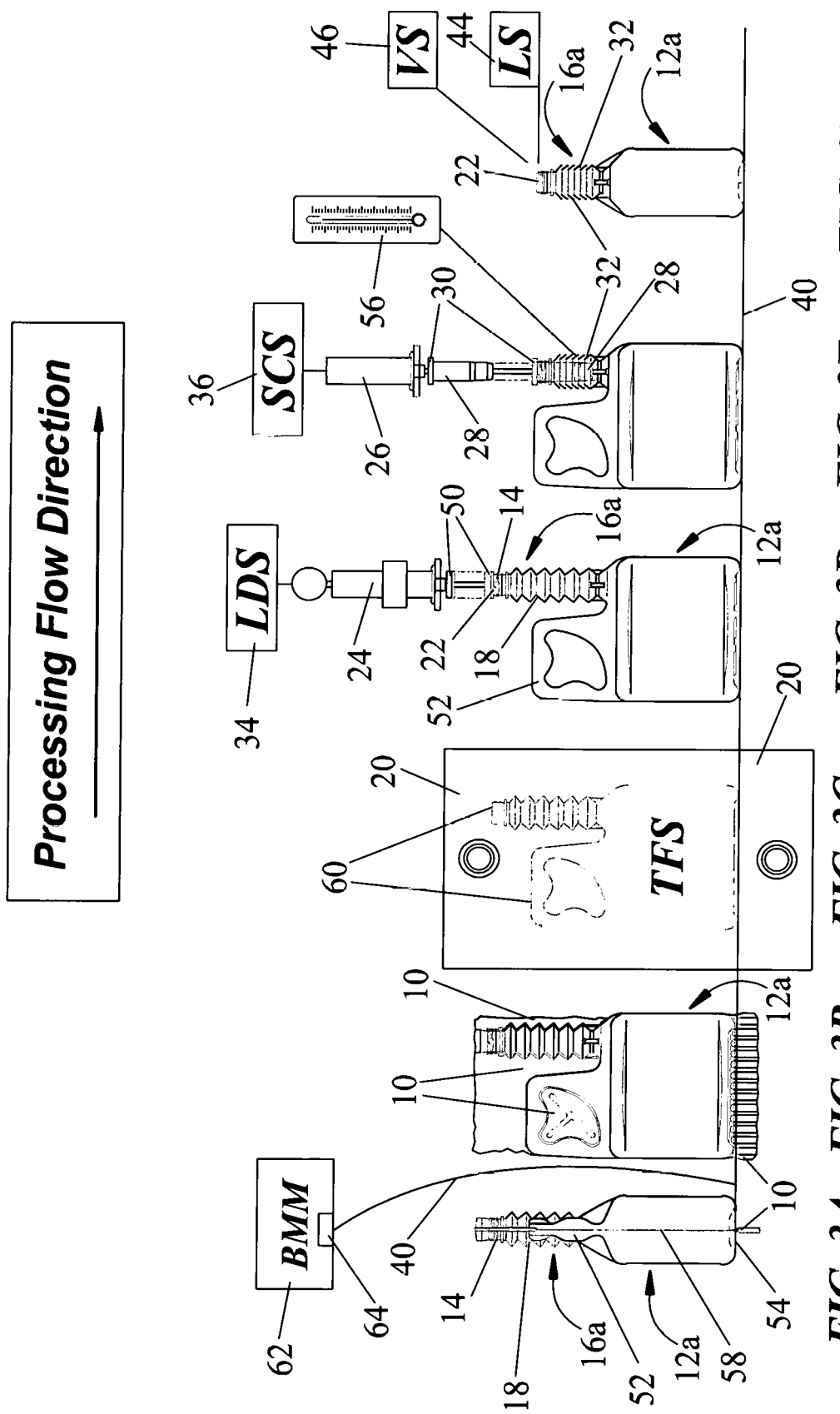

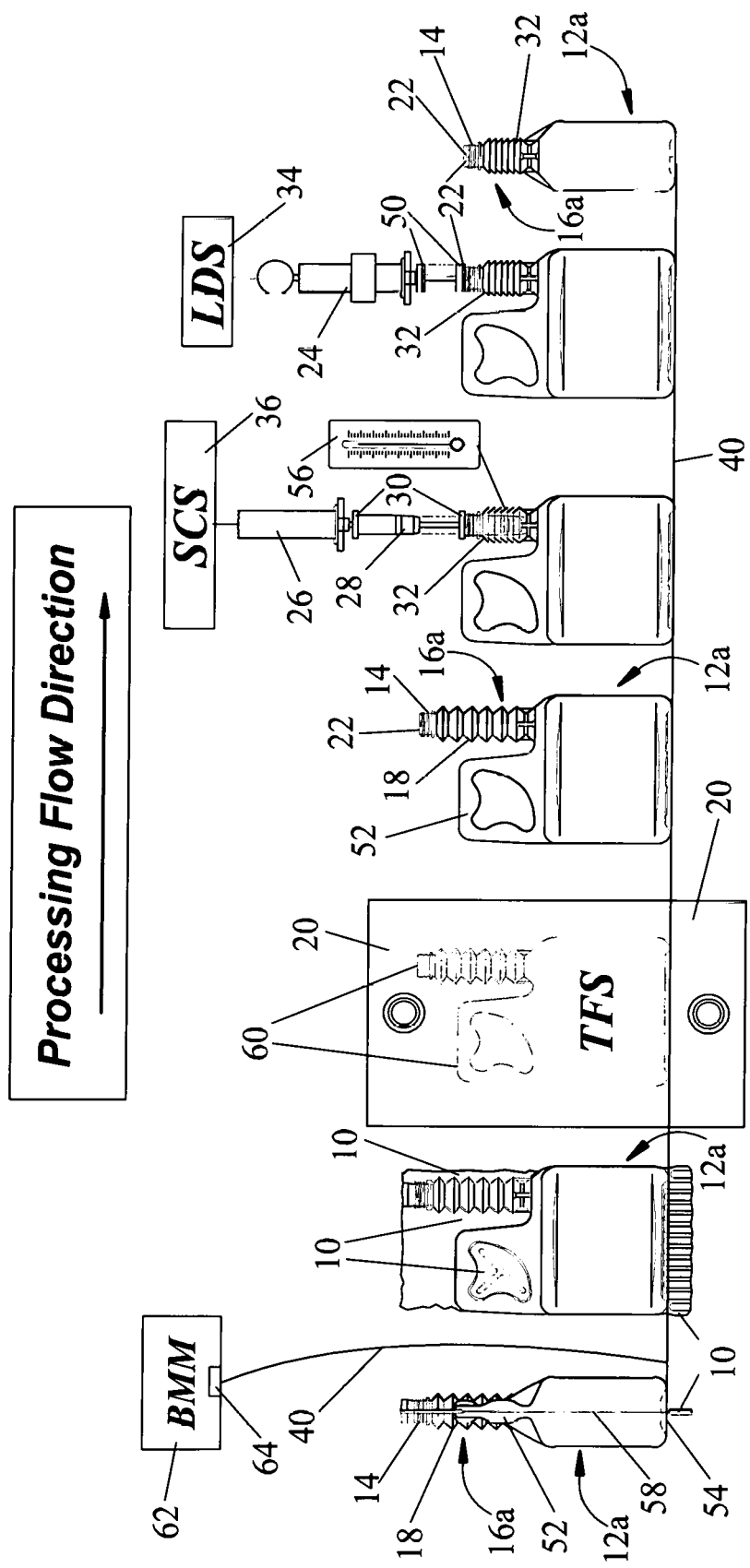

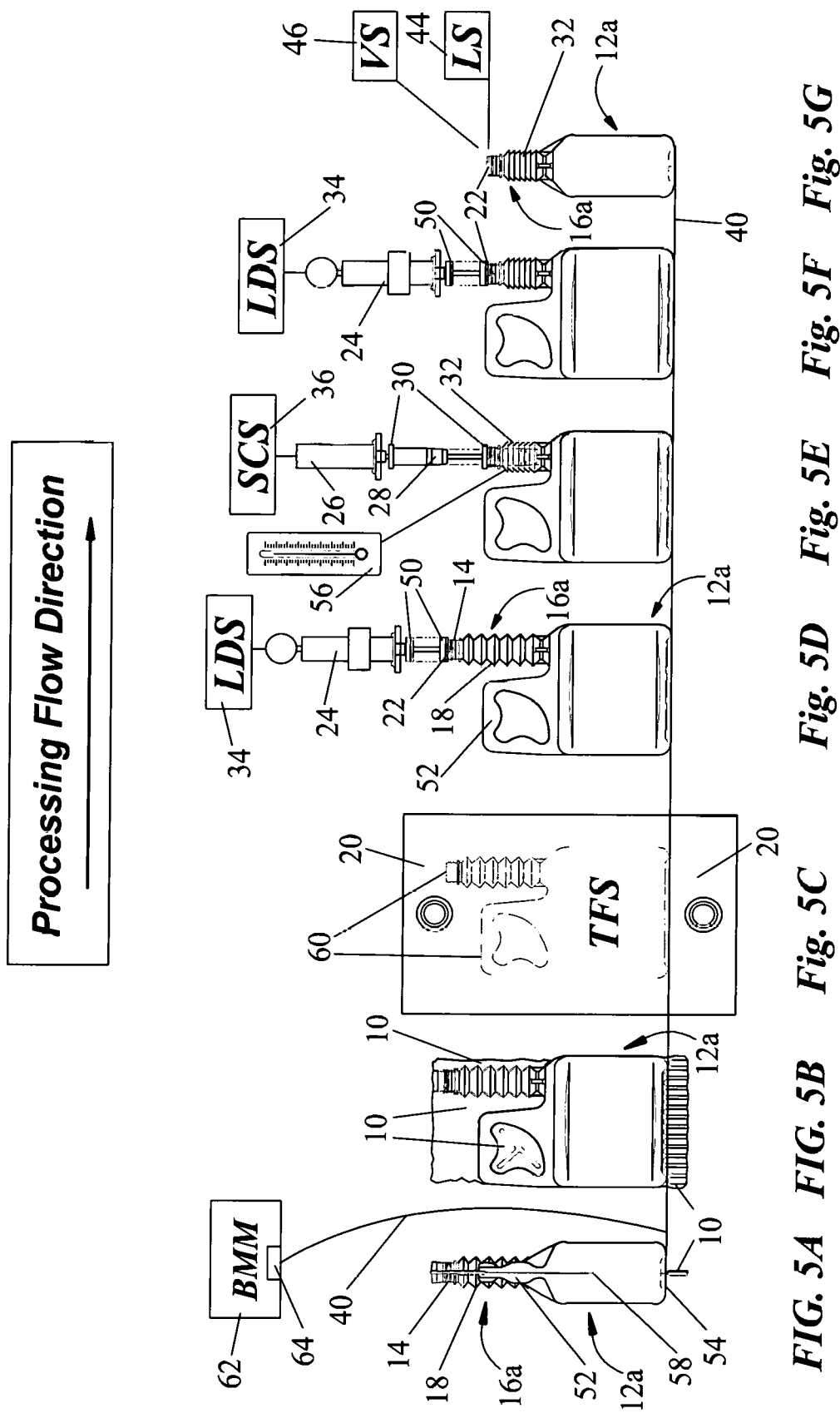

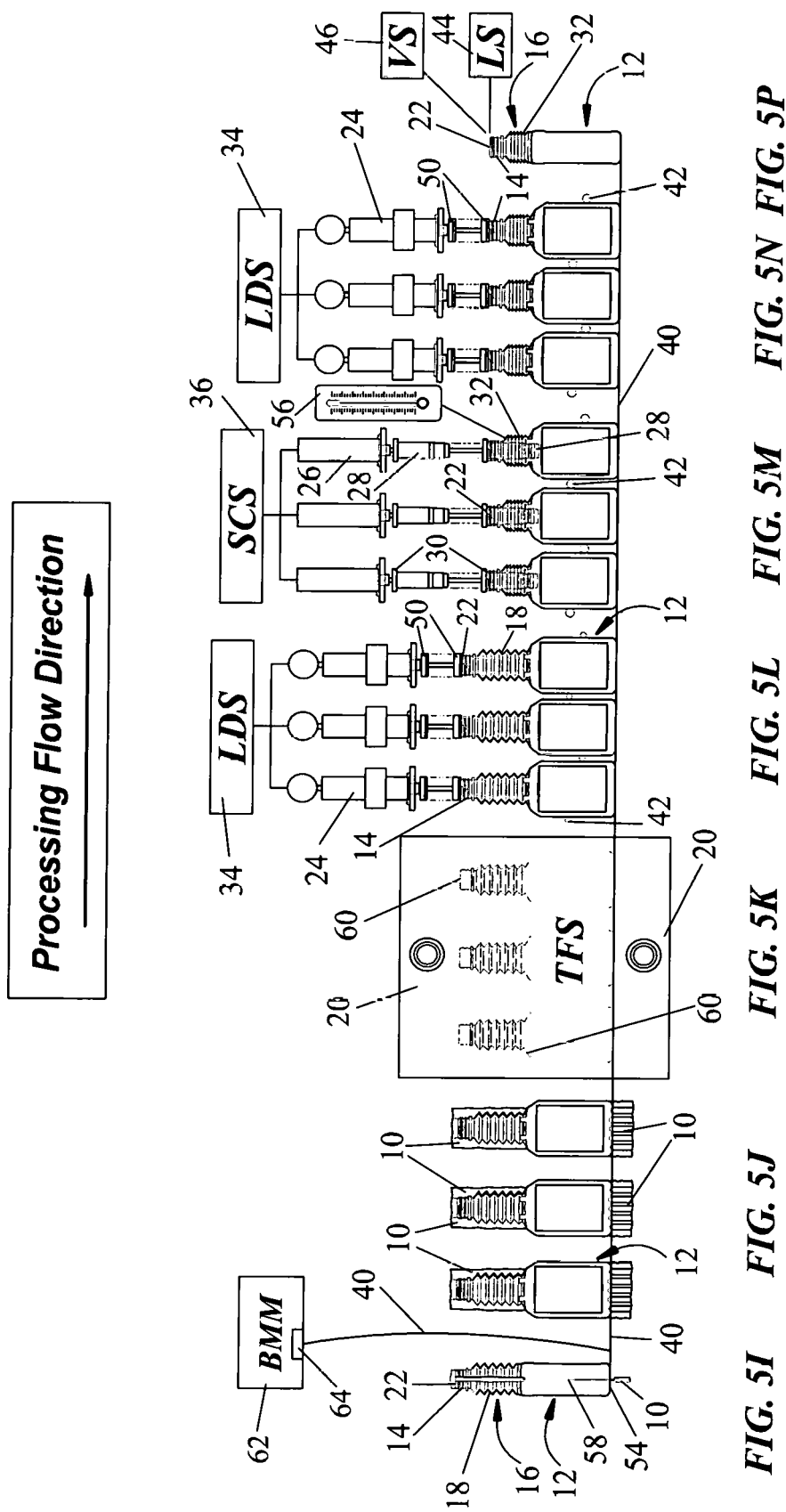

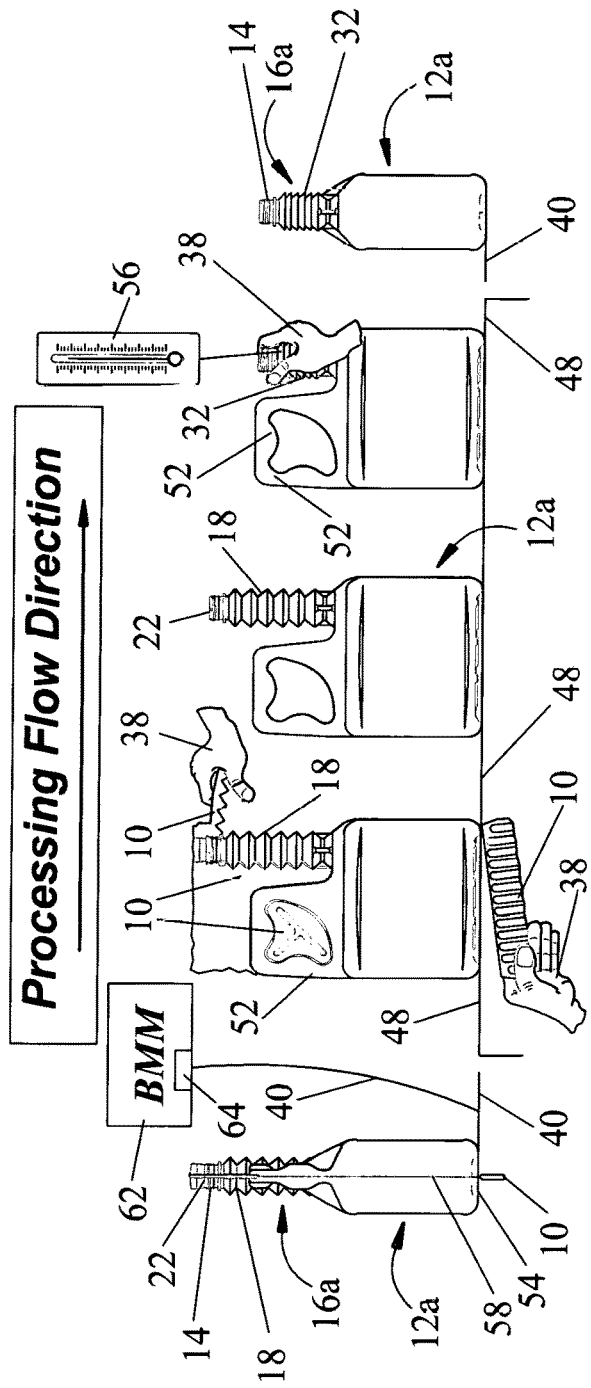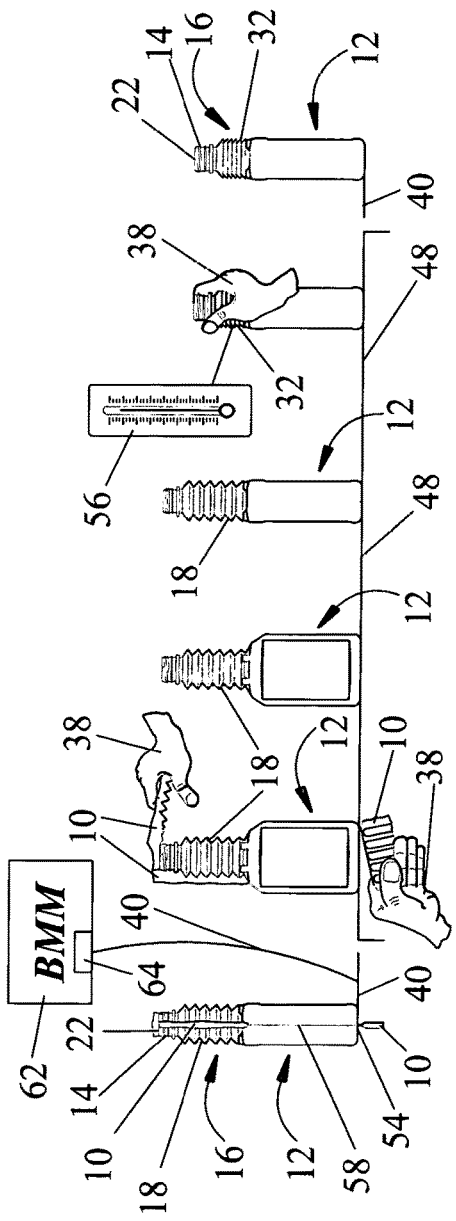

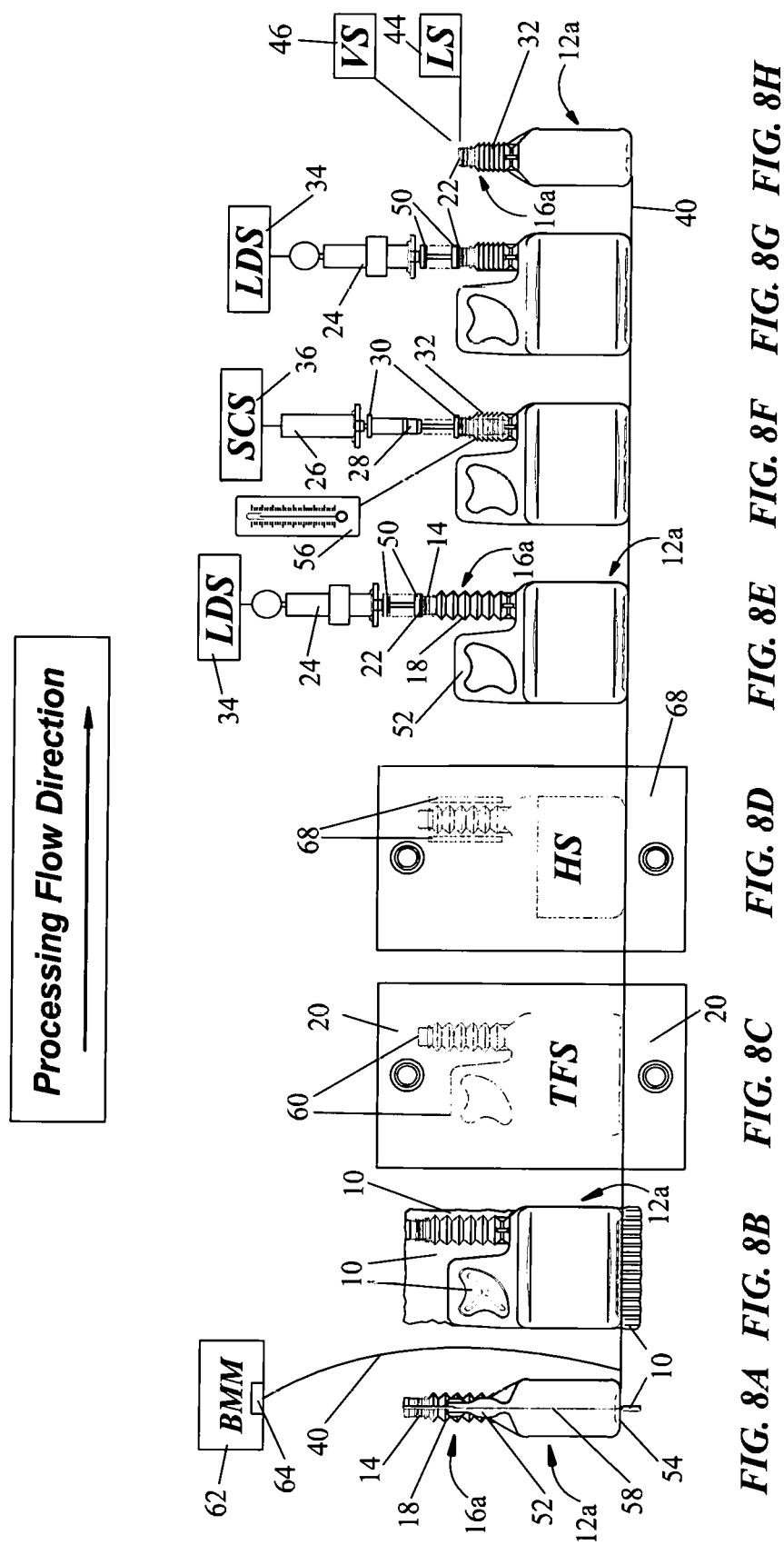

POST MOLD MANUFACTURING CONTAINER HAVING AN INTEGRAL COLLAPSIBLE SPOUT

CROSS-REFERENCES TO RELATED APPLICATIONS

Nonapplicable

FEDERALLY SPONSORED RESEARCH

Nonapplicable

SEQUENCE LISTING OR PROGRAM

Nonapplicable

BACKGROUND

The present disclosure relates generally to methods and systems for post mold manufacturing of blow molded containers.

Plastic containers that have been extrusion blow molded are often formed with flashing in various areas along top, bottom, and/or handle portions of a container during the blow molding process. This flashing is excess material and needs to be separated from the finished container during a post mold process.

It is common practice to remove flashing using standard automated trim tooling stations combined with neck shaping or finishing systems that are adapted to match finished neck specifications, and the profile of the respective containers being produced.

Depending on the shape and size of a container, a captive parison can be used to reduce flashing. Alternatively, depending on the shape, size and material used to make a container, an injection blow molding process can be used which may eliminate flashing all together. Each of these blow molding methods directly affect how a container will be manufactured and finished post mold.

Subsequently, once a containers neck sealing surface is finished and calibrated, and/or a container has been processed through trimming and neck finishing stages, the containers are now ready to be inspected using a leak detecting apparatus. The leak detecting apparatus temporarily engages the neck sealing surface of the finished neck and pressurizes the container with air to test for any holes. Once containers have successfully passed through leak detection, they are now ready for other manufacturing steps that may include flame treatment, bulk palletization, filling and packaging.

However, it is at this stage where containers having an integral collapsible spout presents a challenge for production. Accordingly, a solution is needed for post mold manufacturing a container having an integral collapsible spout.

BRIEF SUMMARY

Disclosed herein in are methods of post mold manufacturing a container having an integral collapsible spout molded in an extended position with flashing affixed to and surrounding the integral collapsible spout proximal to the mold parting line. A transporting means can be moving the container from a blow molding machine to a trimming finishing station, where flashing is removed and the integral collapsible spout may be trimmed to specifications.

Further, in one or more aspects the container can be transported from the trimming finishing station, to a leak detecting station and inspected with the integral collapsible spout in the molded extended position. Subsequently, with the integral collapsible spout extended, the container can be transported to a spout collapsing station while the integral collapsible spout material is thermally pliable; permitting the integral collapsible spout to be compressed to a predetermined fully collapsed position. Optionally, upon exiting the spout collapsing station; the container can be transported to a second leak detecting station and inspected with the integral collapsible spout in the fully collapsed position.

In another implementation example of post mold manufacturing a container having an integral collapsible spout molded in an extended position, with flashing affixed to and surrounding the integral collapsible spout; the container may be transported from a blow molding machine to a trimming finishing station where the integral collapsible spout may be trimmed to specifications. With the integral collapsible spout extended, the container can then be transported to a dual-purpose spout collapsing station featuring an integral leak detecting apparatus. Here, the integral collapsible spout can be inspected in the fully extended position where a pneumatic cylinder can subsequently continue ram stroke travel, compressing the integral collapsible spout while its material is thermally pliable; permitting the integral collapsible spout to be transformed to a predetermined fully collapsed position; wherein a second leak detecting inspection may occur.

An additional implementation example can feature a heating station to reheat the material of integral collapsible spout in the molded extended position, to a thermally pliable state, prior to compressing the integral collapsible spout to a predetermined fully collapsed position.

In one or more aspects, the above exemplary implementations can be adapted to processing a plurality of containers simultaneously for optimum post mold manufacturing throughput. Optionally, planarity tolerance of the integral collapsible spout can be inspected in the fully collapsed position with a laser system, and/or vision system.

Another implementation for post mold manufacturing can comprise: a container having an integral collapsible spout molded in an extended position; with flashing affixed to and surrounding the integral collapsible spout; a transporting means moving the container from a blow molding machine to a manual trimming finishing station; where flashing can be removed; integral collapsible spout may be trimmed in fully extended position while material of the integral collapsible spout is thermally pliable; and integral collapsible spout can be compressed to the fully collapsed position by a human hand.

BRIEF DESCRIPTION OF THE DRAWINGS

The components in the drawings are not necessarily to scale relative to each other. Like reference numerals designate corresponding parts throughout the several views.

FIG. 3A illustrates a left end view of FIG. 3B where container can be transported from BMM blow molding machine according to an implementation of the invention;

FIG. 3B illustrates right side view of a container having an integral collapsible spout in the molded extended position with flashing and a handle according to an implementation of the invention;

FIG. 3C illustrates right side view of TFS trimming finishing station for removing flashing and trimming container to specifications according to an implementation of invention;

FIG. 3D illustrates right side view of a container having an integral collapsible spout in the molded extended position with a handle and flashing removed where container can be leak detected leak detected with integral collapsible spout in molded extended position at LDS leak detecting station according to an implementation of the invention;

FIG. 3E illustrates right side view of container with thermally pliable material present at a SCS spout collapsing station where container having an integral collapsible spout molded in extended position can be compressed from molded extended position to fully collapsed position according to an implementation of the invention;

FIG. 3F illustrates right end view of FIG. 3E container having an integral collapsible spout in fully collapsed position and can be inspected with an optional LS laser system and/or VS vision system according to an implementation of the invention;

FIG. 4A illustrates a left end view of FIG. 4B where container can be transported from BMM blow molding machine according to an implementation of the invention;

FIG. 4B illustrates right side view of a container having an integral collapsible spout in the molded extended position with flashing and a handle according to an implementation of the invention;

FIG. 4C illustrates right side view of TFS trimming finishing station for removing flashing and trimming container to specifications according to an implementation of invention;

FIG. 4D illustrates right side view of a container having an integral collapsible spout in the molded extended position with a handle and flashing removed according to an implementation of the invention;

FIG. 4E illustrates right side view of container with thermally pliable material present at a SCS spout collapsing station where container having an integral collapsible spout molded in extended position can be compressed from molded extended position to fully collapsed position according to an implementation of the invention;

FIG. 4F illustrates right side view of container having an integral collapsible spout in fully collapsed position at LDS leak detecting station where container can be leak detected with integral spout in fully collapsed position according to an implementation of the invention;

FIG. 4G illustrates right end view of FIG. 4F container having an integral collapsible spout in fully collapsed position according to an implementation of the invention;

FIG. 5A illustrates a left end view of FIG. 5B where container can be transported from BMM blow molding machine according to an implementation of the invention;

FIG. 5B illustrates right side view of a container having an integral collapsible spout in the molded extended position with flashing and a handle according to an implementation of the invention;

FIG. 5C illustrates right side view of TFS trimming finishing station for removing flashing and trimming container to specifications according to an implementation of the invention;

FIG. 5D illustrates right side view of a container having an integral collapsible spout in the molded extended position with a handle and flashing removed where container can be leak detected with integral collapsible spout in molded extended position at LDS leak detecting station according to an implementation of the invention;

FIG. 5E illustrates right side view of container with thermally pliable material present at a SCS spout collapsing station where container having an integral collapsible spout molded in extended position can be compressed from molded extended position to fully collapsed position according to an implementation of the invention;

FIG. 5F illustrates right side view of container having an integral collapsible spout in fully collapsed position at LDS leak detecting station where container can be leak detected with integral spout in fully collapsed position according to an implementation of the invention;

FIG. 5G illustrates right end view of FIG. 5F container having an integral collapsible spout in fully collapsed position and can be inspected with an optional LS laser system and/or VS vision system according to an implementation of the invention;

FIG. 5I illustrates a left end view of FIG. 5J where container can be transported from BMM blow molding machine according to an implementation of the invention;

FIG. 5J illustrates right side view of a plurality of containers having an integral collapsible spout in the molded extended position with flashing according to an implementation of the invention;

FIG. 5K illustrates right side view of TFS trimming finishing station with a plurality of cavities for removing flashing and trimming multiple containers simultaneously to specifications according to an implementation of invention;

FIG. 5L illustrates right side view of a plurality of containers having an integral collapsible spout in the molded extended position and flashing removed processing multiple containers simultaneously with integral collapsible spout in molded extended position at LDS leak detecting station according to an implementation of the invention;

FIG. 5M illustrates right side view of a plurality of containers with thermally pliable material present at a SCS spout collapsing station where multiple containers having an integral collapsible spout molded in extended position can be compressed from molded extended position to fully collapsed position simultaneously according to an implementation of the invention;

FIG. 5N illustrates right side view of a plurality of containers having an integral collapsible spout in fully collapsed position at LDS leak detecting station and can be leak detected in fully collapsed position according to an implementation of the invention;

FIG. 5P illustrates right end view of FIG. 5N container having an integral collapsible spout in fully collapsed position and can be inspected with an optional LS laser system and/or VS vision system according to an implementation of the invention;

FIG. 6A illustrates a left end view of FIG. 6B where container can be transported from BMM blow molding machine according to an implementation of the invention;

FIG. 6B illustrates right side view of a container having an integral collapsible spout in the molded extended position with flashing and a handle wherein the flashing can be removed by human hand according to an implementation of the invention;

FIG. 6C illustrates right side view of a container having an integral collapsible spout in the molded extended position with a handle and flashing removed according to an implementation of the invention;

FIG. 6D illustrates right side view of container with thermally pliable material present and integral collapsible spout can be compressed from molded extended position to fully collapsed position by human hand according to an implementation of the invention;

FIG. 6E illustrates right end view of FIG. 6D container having an integral collapsible spout in fully collapsed position according to an implementation of the invention;

FIG. 7A illustrates a left end view of FIG. 7B where container can be transported from BMM blow molding machine according to an implementation of the invention;

FIG. 7B illustrates right side view of a container having an integral collapsible spout in the molded extended position with flashing wherein the flashing can be removed by human hand according to an implementation of the invention;

FIG. 7C illustrates right side view of a container having an integral collapsible spout in the molded extended position with flashing removed according to an implementation of the invention;

FIG. 7D illustrates right end view of FIG. 7C container having an integral collapsible spout in the molded extended position with flashing removed according to an implementation of the invention;

FIG. 7D illustrates right end view of container with thermally pliable material present and integral collapsible spout can be compressed from molded extended position to fully collapsed position by human hand according to an implementation of the invention;

FIG. 7F illustrates right end view of container with integral collapsible spout compressed to fully collapsed position according to an implementation of the invention;

FIG. 8A illustrates a left end view of FIG. 8B where container can be transported from BMM blow molding machine according to an implementation of the invention;

FIG. 8B illustrates right side view of a container having an integral collapsible spout in the molded extended position with flashing and a handle according to an implementation of the invention;

FIG. 8C illustrates right side view of TFS trimming finishing station for removing flashing and trimming container to specifications according to an implementation of the invention;

FIG. 8D illustrates right side view of HS heating station where material of integral collapsible spout molded in extended position can be reheated to be thermally pliable according to an implementation of the invention;

FIG. 8E illustrates right side view of a container having an integral collapsible spout in the molded extended position with a handle and flashing removed where container can be leak detected with integral collapsible spout in molded extended position at LDS leak detecting station according to an implementation of the invention;

FIG. 8F illustrates right side view of container with thermally pliable material present at a SCS spout collapsing station where container having an integral collapsible spout molded in extended position can be compressed from molded extended position to fully collapsed position according to an implementation of the invention;

FIG. 8G illustrates right side view of container having an integral collapsible spout in fully collapsed position at LDS leak detecting station where container can be leak detected with integral collapsible spout in fully collapsed position according to an implementation of the invention;

FIG. 8H illustrates right end view of FIG. 8G container having an integral collapsible spout in fully collapsed position and being inspected with an optional LS laser system and/or VS vision system according to an implementation of the invention;

Figures 1A, 1B, 1C, 1D, 1E, 1F, 1G:
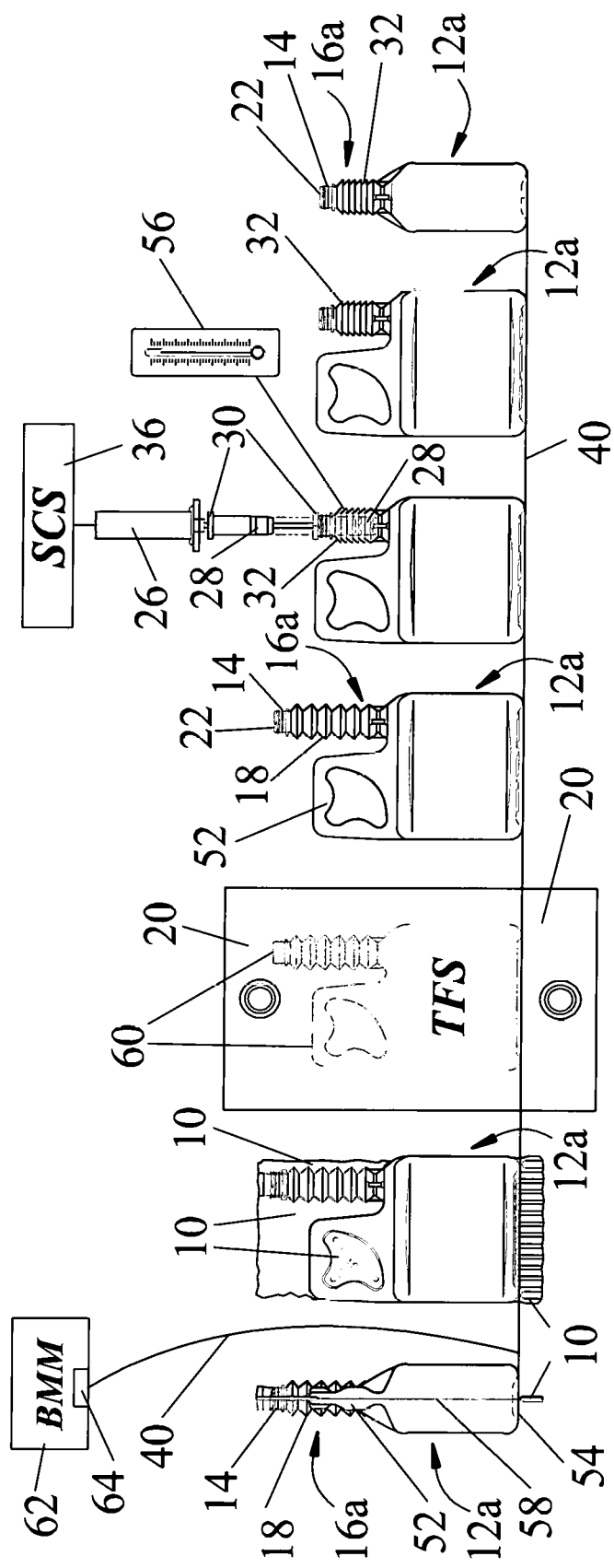
FIG. 1A illustrates a left end view of FIG. 1B where container can be transported from BMM blow molding machine according to an implementation of the invention.
FIG. 1B illustrates right side view of a container having an integral collapsible spout in the molded extended position with flashing and a handle according to an implementation of the invention.
FIG. 1C illustrates right side view of TFS trimming finishing station for removing flashing and trimming container to specifications according to an implementation of the invention.
FIG. 1D illustrates right side view of a container having an integral collapsible spout in the molded extended position with a handle and flashing removed according to an implementation of the invention.
FIG. 1E illustrates right side view of container with thermally pliable material present and integral collapsible spout can be compressed from molded extended position at SCS spout collapsing station to fully collapsed position according to an implementation of the invention.
FIG. 1F illustrates right side view of container having an integral collapsible spout in fully collapsed position according to an implementation of the invention.
FIG. 1G illustrates right end view of FIG. 1F container having an integral collapsible spout in fully collapsed position according to an implementation of the invention.
Figure 3G:
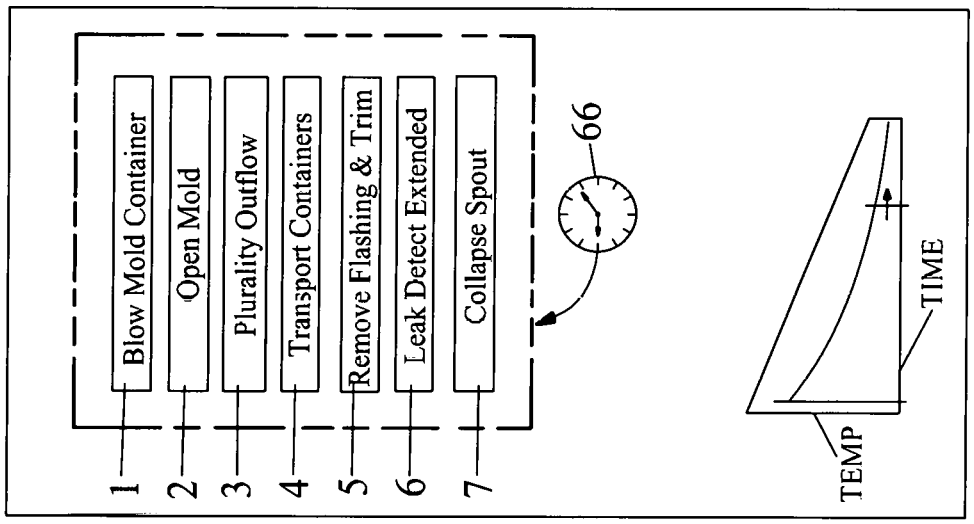
FIG. 3G is a flow chart with temperature and time graphs illustrating processes for post mold manufacturing container having an integral collapsible spout as illustrated in schematic depiction FIG. 3A-FIG. 3F according to an implementation of the invention.

REFERENCE NUMERALS 10 flashing
12 container having an integral collapsible spout
12a container having an integral collapsible spout
14 neck
16 integral collapsible spout
16a integral collapsible spout
18 molded extended position
20 TFS trimming finishing station
22 neck opening sealing surface
24 leak detecting apparatus
26 pneumatic cylinder
28 spout compression mandrel
28a spout compression mandrel
28b spout compression mandrel
28c spout compression mandrel with air channel
30 spout compression mandrel shoulder
32 fully collapsed position
34 LDS leak detecting station
36 SCS spout collapsing station
38 human hand
40 conveyor
42 retractable positioning mechanisms
44 LS laser inspection system
46 VS vision inspection system
48 work surface
50 leak detecting mandrel
52 handle
54 container bottom
56 thermally pliable material
58 mold parting line
60 TFS cutting edges
62 BMM blow molding machine
64 outflow
66 time window before cools
68 HS heating station
70 spout collapsing station with integral leak detecting apparatus
72 leak detecting air supply
74 mandrel sealing surface
76 mandrel air passage

DETAILED DESCRIPTION

In the following detailed description, references are made to accompanying drawings that form a part hereof and that show, by way of illustration, specific implementations or examples. In referring to the drawings, like numerals represent like elements throughout the several figures.

In some implementations, methods of post mold manufacturing containers having an integral collapsible spout molded in the extended position are utilizing retained latent heat from the blow molding process. This is providing thermally pliable material, permitting the integral collapsible spout to be transformed from the molded extended position to the fully collapsed position. In another implementation, a heating station is provided to reheat the integral collapsible spout in the molded extended position to a thermally pliable state for transforming the integral collapsible spout to the fully collapsed position. Another implementation is providing a spout collapsing station with an integral leak detecting apparatus for combining a three-step process into one processing station. These and other benefits of one or more aspects will become apparent from a consideration of the ensuing description and accompanying drawings.

FIG. 1A-FIG. 1G illustrates one implementation of a post mold manufacturing process of container 12a having integral collapsible spout 16a, formed in molded extended position 18, neck 14, supporting neck sealing surface 22, transporting on conveyor 40 from outflow 64 of blow molding machine BMM 62, showing flashing 10, proximal to mold parting line 58, surrounding integral collapsible spout 16a molded in extended position 18, affixed to several areas that include; neck 14, handle 52, and container bottom 54. This flashing 10 needs to be removed and can be accomplished in one implementation through trimming finishing station TFS 20 with cutting edges 60.

Figure 1H:
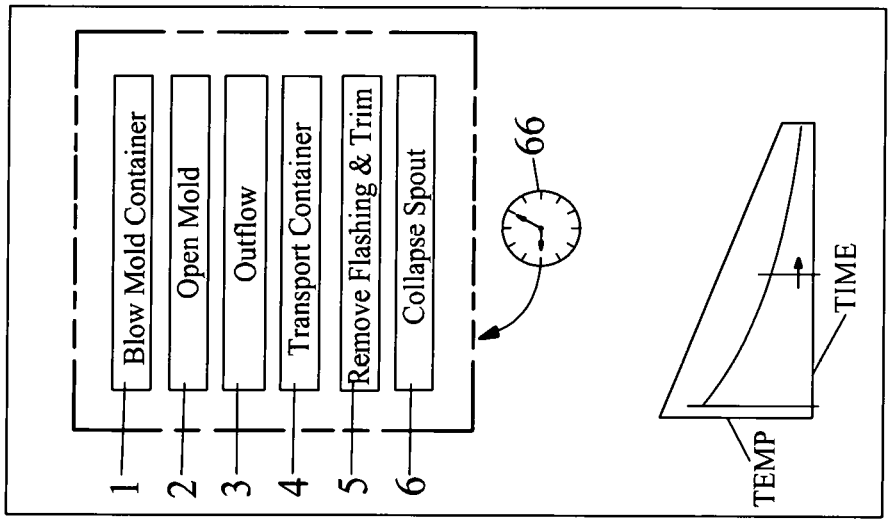
FIG. 1H is a flow chart with temperature and time graphs illustrating processes for post mold manufacturing container having an integral collapsible spout as illustrated in schematic depiction FIG. 1A-FIG. 1G according to an implementation of the invention.

FIG. 1H, is a flow chart with temperature and time graphs illustrating post mold sequential manufacturing stages of FIG. 1A-FIG. 1E, occurring within time window before material cools 66 for de-flashing, trimming and compressing integral collapsible spout 16a to fully collapsed position 32. This process may be completed while thermally pliable material 56 of integral collapsible spout 16a is present during processing through spout collapsing station SCS 36, providing pneumatic cylinder 26, fitted with spout compression mandrel 28, having spout compression mandrel shoulder 30, for engaging neck sealing surface 22, and transforming integral collapsible spout 16a, from molded extended position 18, to fully collapsed position 32.

Figure 2H:
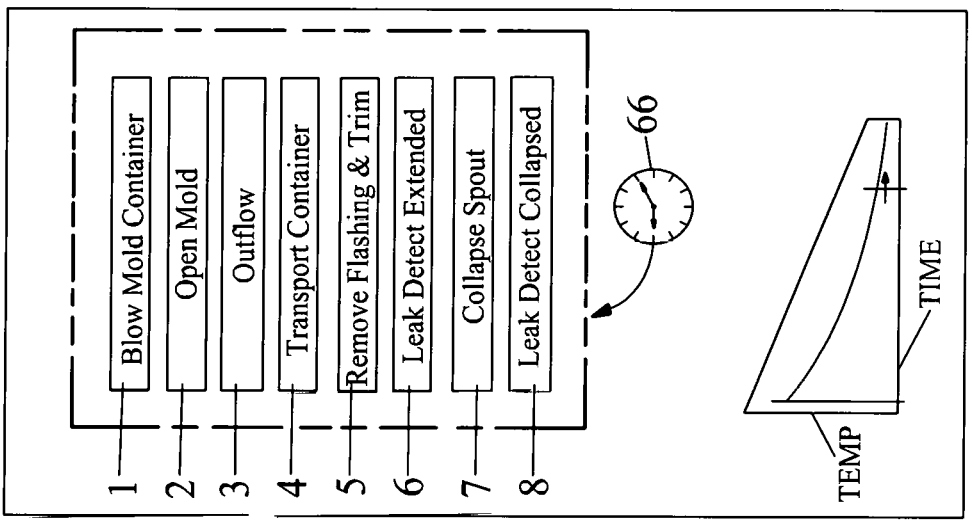
FIG. 2H is a flow chart with temperature and time graphs illustrating processes for post mold manufacturing container having an integral collapsible spout as illustrated in schematic depiction FIG. 2A-FIG. 2G according to an implementation of the invention.

In another implementation, FIG. 2A-FIG. 2G shows post mold manufacturing the same container elements of FIG. 1A-FIG. 1G wherein a different mechanism for compressing integral collapsible spout 16a to fully collapsed position 32 is implemented. Here, dual-purpose spout collapsing station with integral leak detecting apparatus 70, fitted with auxiliary leak detecting air supply 72, affixed to spout compression mandrel with air channel 28c, featuring neck sealing surface 74 affixed to spout compression mandrel shoulder 30, engaging neck opening sealing surface 22 for leak detecting while integral collapsible spout 16a is in molded extended position 18, wherein thermally pliable material 56 of integral collapsible spout 16a is present for transforming to fully collapsed position 32, wherein a second leak detecting inspection may be performed. FIG. 2H is a flow chart with temperature and time graphs illustrating post mold sequential manufacturing stages of FIG. 2A-FIG. 2E occurring during time window before material cools 66.

Another implementation example illustrated in FIG. 3A-FIG. 3F shows post mold manufacturing the same container elements of FIG. 1A-FIG. 1G and FIG. 2A-FIG. 2G wherein an independent leak detecting station LDS 34 is performing an inspection with integral collapsible spout 16a in molded extended position 18, prior to having spout collapsing station SCS 36 with pneumatic cylinder 26, spout compression mandrel 28 with spout compression mandrel shoulder 30, compressing thermally pliable material 56 of integral collapsible spout 16a, to fully collapsed position 32. FIG. 3G is a flow chart with temperature and time graphs illustrating post mold sequential manufacturing stages of FIG. 3A-FIG. 3E occurring during time window before material cools 66.

FIG. 4A-FIG. 4G illustrates another implementation example showing post mold manufacturing of the same container elements of FIG. 1A-FIG. 1G, FIG. 2A-FIG. 2G, and FIG. 3A-FIG. 3F illustrating integral collapsible spout 16a can be inspected with leak detecting station LDS 34 in fully collapsed position 32, subsequent to being compressed by spout collapsing station SCS 36. FIG. 4H is a flow chart with temperature and time graphs illustrating post mold sequential manufacturing stages of FIG. 4A-FIG. 4E, occurring during time window before material cools 66.

Figure 5Q:
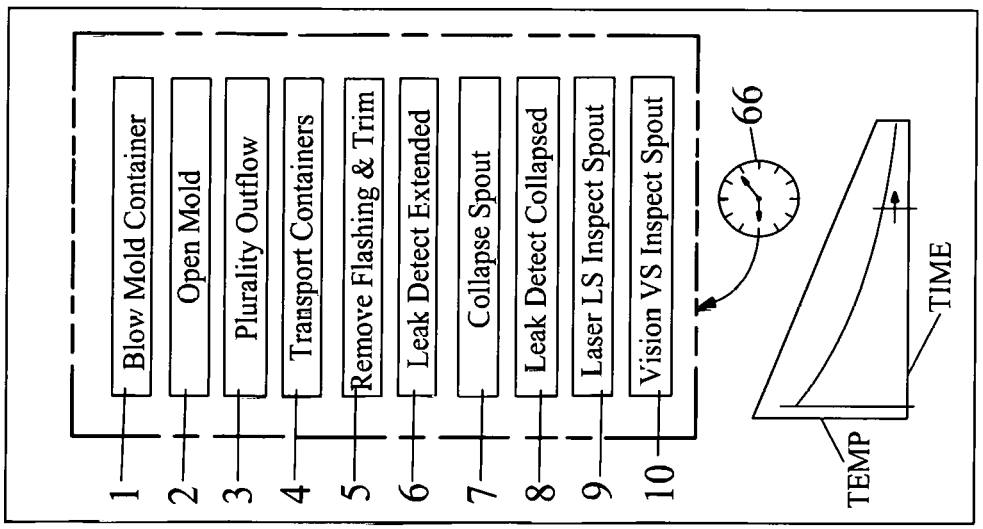
FIG. 5Q is a flow chart with temperature and time graphs illustrating processes for post mold manufacturing container having an integral collapsible spout as illustrated in schematic depiction FIG. 5I-FIG. 5P according to an implementation of the invention.
Figure 5H:
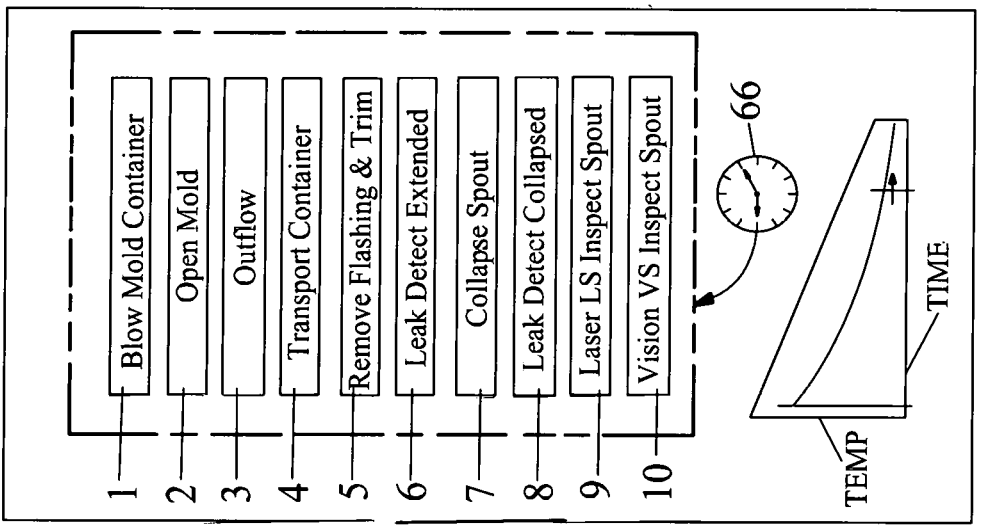
FIG. 5H is a flow chart with temperature and time graphs illustrating processes for post mold manufacturing container having an integral collapsible spout as illustrated in schematic depiction FIG. 5A-FIG. 5G according to an implementation of the invention.
Figure 4H:
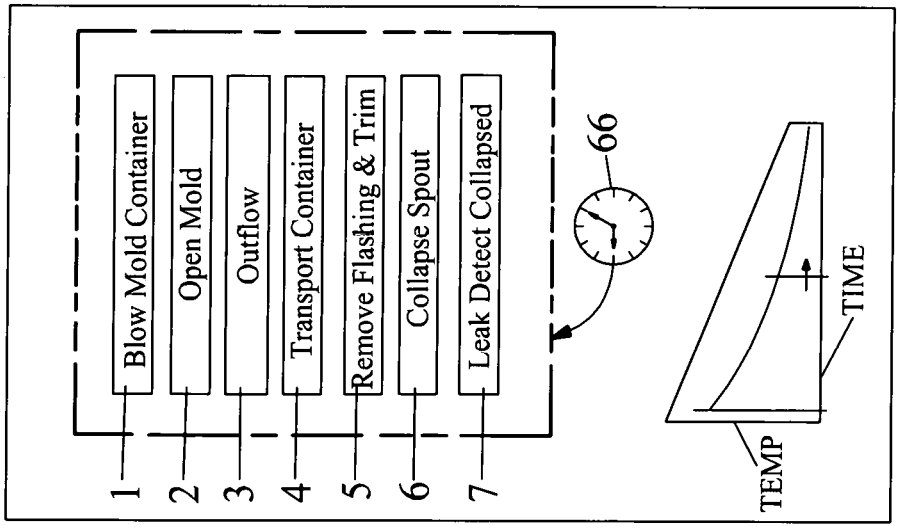
FIG. 4H is a flow chart with temperature and time graphs illustrating processes for post mold manufacturing container having an integral collapsible spout as illustrated in schematic depiction FIG. 4A-FIG. 4G according to an implementation of the invention.
Figure 8I:
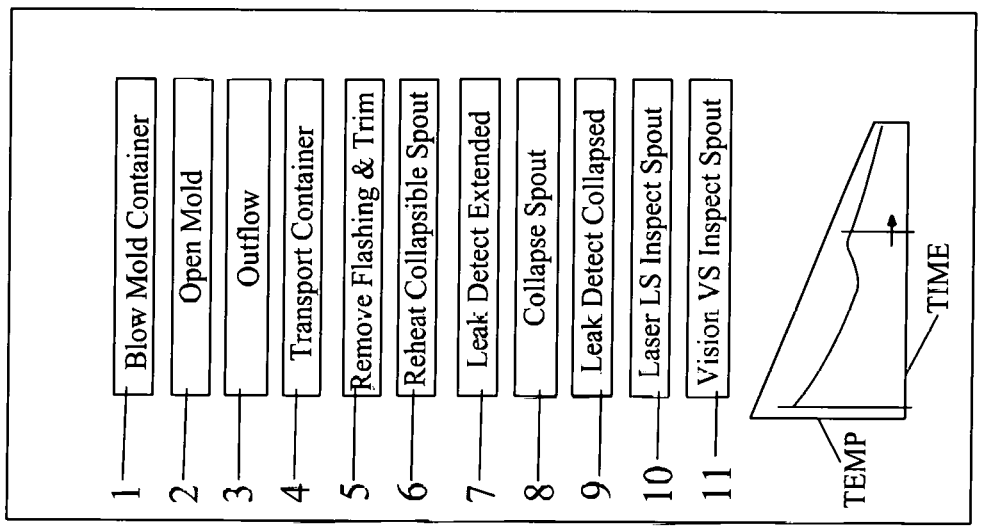
FIG. 8I is a flow chart with temperature and time graphs illustrating processes for post mold manufacturing container having an integral collapsible spout as illustrated in schematic depiction FIG. 8A-FIG. 8H according to an implementation of the invention.
Figure 7G:
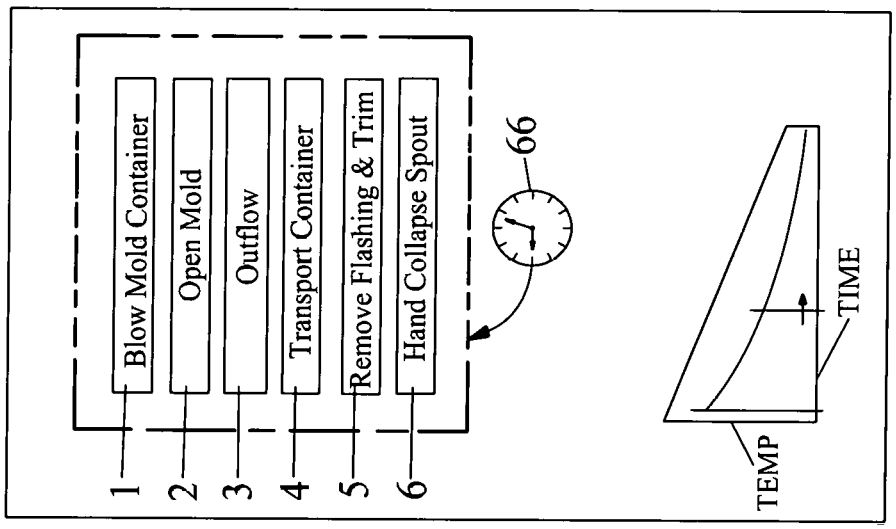
FIG. 7G is a flow chart with temperature and time graphs illustrating processes for post mold manufacturing container having an integral collapsible spout as illustrated in schematic depiction FIG. 7A-FIG. 7F according to an implementation of the invention.
Figure 6F:
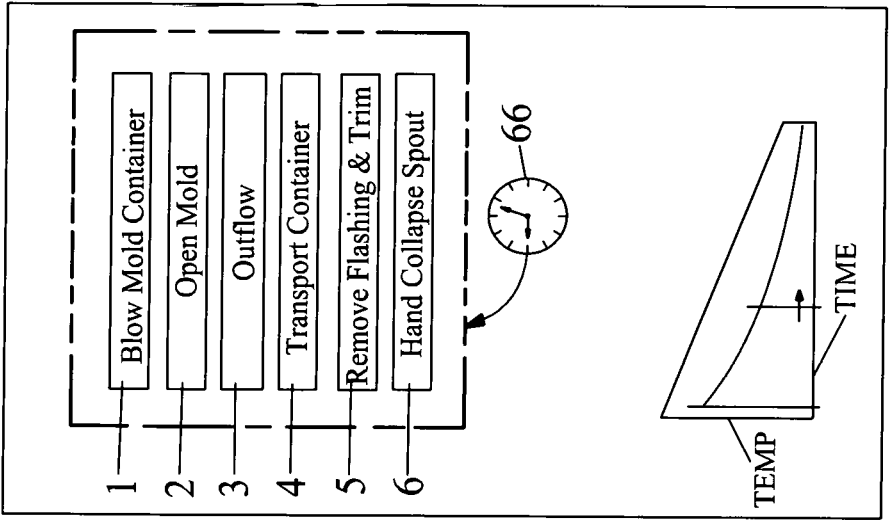
FIG. 6F is a flow chart with temperature and time graphs illustrating processes for post mold manufacturing container having an integral collapsible spout as illustrated in schematic depiction FIG. 6A-FIG. 6E according to an implementation of the invention.

FIG. 5A-FIG. 5G illustrates another implementation example showing post mold manufacturing of the same container elements of FIG. 1A-FIG. 1G, FIG. 2A-FIG. 2G, FIG. 3A-FIG. 3F, and FIG. 4A-FIG. 4G wherein leak detecting station LDS 34, may be implemented to inspect integral collapsible spout 16a in molded extended position 18, prior to spout collapsing station SCS 36, and can be leak detected again with a second leak detecting station LDS 34 subsequent to having integral collapsible spout 16a compressed to fully collapsed position 32. Optionally, laser system LS 44 and/or vision system VS 46 may be implemented to inspect planarity tolerance of integral collapsible spout 16a in fully collapsed position 32. FIG. 5H is a flow chart with temperature and time graphs illustrating post mold sequential manufacturing stages of FIG. 5A-FIG. 5E, occurring during time window before material cools 66.

Illustrated in FIG. 5I-FIG. 5P, another implementation example can be providing multiple containers simultaneously to different method steps for increased throughput. The containers can be located precisely with retractable positioning mechanisms 42 at respective processing stations, wherein a plurality of containers having an integral collapsible spout 12 molded in extended position 18; with flashing 10 affixed to and surrounding integral collapsible spout 16; can be transported on conveyor 40 from blow molding machine BMM 62, to trimming finishing station TFS 20 having a plurality of cavities, wherein flashing 10 is removed and neck 14, supporting neck opening sealing surface 22 can be finish and trimmed to specifications.

Further, transporting containers with integral collapsible spout 16 in molded extended position 18 to first leak detecting station LDS 34; subsequently transporting containers while thermally pliable material 56 is present for spout collapsing station SCS 36; then transporting containers with integral collapsible spout 16 compressed to fully collapsed position 32, through an optional second leak detecting station LDS 34.

Optionally, laser system LS 44 and/or vision system VS 46 may be implemented to inspect planarity tolerance of integral collapsible spout 16 in fully collapsed position 32. FIG. 5Q is a flow chart with temperature and time graphs illustrating post mold sequential manufacturing stages of FIG. 5I-FIG. 5M, occurring during time window before material cools 66.

An alternative implementation example is illustrated in FIG. 6A-FIG. 6E, wherein a container having an integral collapsible spout 12a; can be transported on conveyor 40 from blow molding machine BMM 62, to work surface 48; showing flashing 10 affixed to several areas that include; portions of container 12a, handle 52, container bottom 54, integral collapsible spout 16a; formed in molded extended position 18, neck 14, supporting neck sealing surface 22; wherein flashing 10 is being trimmed and removed by human hand 38; with integral collapsible spout 16a in molded extended position 18, having thermally pliable material 56 present for compressing to fully collapsed position 32, by at least one human hand 38. FIG. 6F is a flow chart with temperature and time graphs illustrating post mold sequential manufacturing stages of FIG. 6A-FIG. 6D, occurring during time window before material cools 66.

Another implementation example illustrated in FIG. 7A-FIG. 7F, shows container having an integral collapsible spout 12; can be transporting on conveyor 40 from blow molding machine BMM 62, to work surface 48; with flashing 10 affixed to and surrounding integral collapsible spout 16 and portion of container bottom 54, where flashing 10 is trimmed and removed by human hand 38, on work surface 48, with integral collapsible spout 16 in molded extended position 18, having thermally pliable material 56 present for compressing to fully collapsed position 32, by at least one human hand 38. FIG. 7G is a flow chart with temperature and time graphs illustrating post mold sequential manufacturing stages of FIG. 7A-FIG. 7E, occurring during time window before material cools 66.

FIG. 8A-FIG. 8H is an alternative implementation example showing post mold manufacturing of the same container elements of FIG. 5A—FIG. 5G with the addition of heating station 68 implemented after trimming finishing station 20 to reheat integral collapsible spout 16 or 16*a*, while in molded extended position 18 to provide thermally pliable material 56 for processing through spout collapsing station SCS 34, transforming integral collapsible spout 16 or 16*a* to fully collapsed position 32. FIG. 8I is a flow chart illustrating sequential processing stages of FIG. 8A-FIG. 8H wherein the temperature time graph shows an increase in temperature after integral collapsible spout 16 or 16*a* have been reheated, without the element of time window before material cools 66.

Figures 9A, 9B, 9C, 9D, 9E:
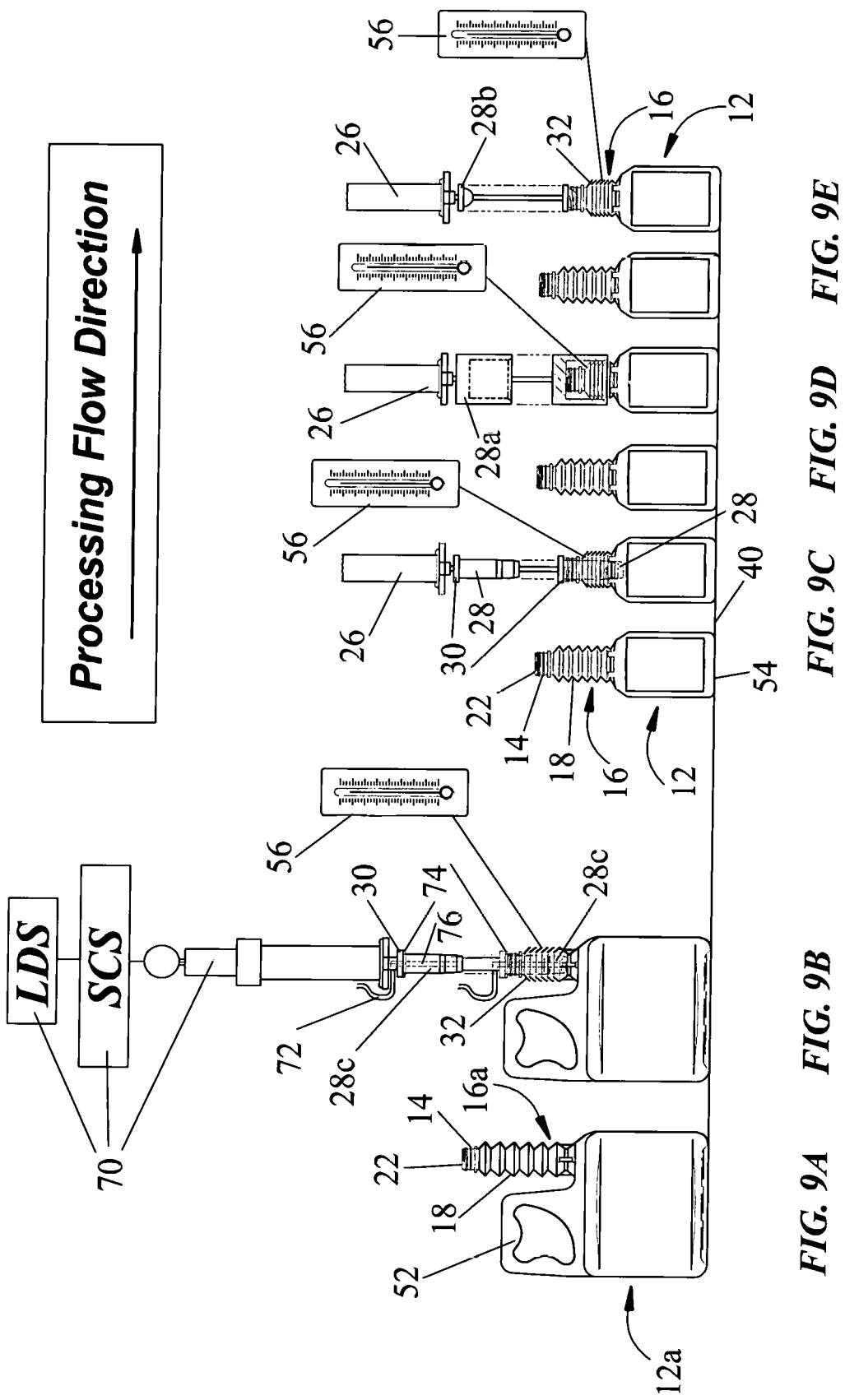
FIG. 9A illustrates right side view of a container having an integral collapsible spout in the molded extended position with a handle and flashing removed according to an implementation of the invention.
FIG. 9B illustrates right side view of container with thermally pliable material present at a dual purpose SCS spout collapsing station having integral LDS leak detecting station where container having an integral collapsible spout molded in extended position can be leak detected and subsequently compressed from molded extended position to fully collapsed position, and leak detected again in fully collapsed position according to an implementation of the invention.
FIG. 9C illustrates right side view of a container with thermally pliable material present at a SCS spout collapsing station where container having an integral collapsible spout molded in extended position can be compressed from molded extended position to fully collapsed position with mandrel 28 according to an implementation of the invention.
FIG. 9D illustrates right side view of a container with thermally pliable material present at a SCS spout collapsing station where container having an integral collapsible spout molded in extended position can be compressed from molded extended position to fully collapsed position with exemplary mandrel 28a according to an implementation of the invention.
FIG. 9E illustrates right side view of a container with thermally pliable material present at a SCS spout collapsing station where container having an integral collapsible spout molded in extended position can be compressed from molded extended position to fully collapsed position with exemplary mandrel 28b according to an implementation of the invention.

FIG. 9B illustrates dual-purpose spout collapsing station with integral leak detecting apparatus 70, fitted with auxiliary leak detecting air supply 72, affixed to spout compression mandrel with air channel 28*c*, providing mandrel air passage 76, featuring neck sealing surface 74 affixed to spout compression mandrel shoulder 30, engaging neck opening sealing surface 22 for leak detecting while integral collapsible spout 16*a* is in molded extended position 18, wherein thermally pliable material 56 of integral collapsible spout 16*a* is present for transforming to fully collapsed position 32, wherein a second leak detecting inspection may be performed. Alternative spout compression mandrels 28, 28*a*, 28*b*, and 28*c* can be implemented as shown in FIG. 9C-FIG. 9E, for compressing integral collapsible 16, and 16*a* from molded extended position 18, to fully collapsed position 32, according to various implementations of the invention.

DETAILED DESCRIPTION—OPERATION

Operation of implementation examples disclosed herein provide various method steps of post mold manufacturing a container having an integral collapsible spout 12 or 12*a*, with integral collapsible spout 16 or 16*a* molded in extended position 18. A specific method may be selected depending on production output volumes and operating speeds of respective manufacturing and/or processing equipment. Either automated or semi-automated post mold processing methods may be used.

Generally, small production quantities produced in a development lab will utilize a semi-automated process where a human being can transport containers from a blow molding machine to a trimming finishing station for removing flashing 10 and trimming the container to specifications. Subsequently, container 12 or 12*a* can be transported by a human being to a spout collapsing station for compressing integral collapsible 16 or 16*a* from molded extended position 18, to fully collapsed position 32.

With focus on higher production volumes of container 12 or 12*a*, the processing flow direction is moving from left to right as illustrated, being transported on conveyor 40. It is to be understood that the processing flow direction of conveyor 40, and degree of angularity or radial planarity of conveyor 40, and related processing or manufacturing equipment can be adapted to any geometrical position or direction to meet respective production equipment specifications, and/or floor plan layouts.

Further, the production line speed of conveyor 40 can be synchronized with production output, throughput, and stop, start speeds of related processing equipment for precisely positioning the container having an integral collapsible spout 12 or 12*a* at each respective manufacturing station, and in harmony with any retractable positioning mechanisms 42.

In implementation examples FIG. 1A-FIG. 1G, FIG. 2A-FIG. 2G, FIG. 3A-FIG. 3F, FIG. 4A-FIG. 4G, FIG. 5A-FIG. 5G, FIG. 5I-FIG. 5P, FIG. 6-FIG. 6E, FIG. 7A-FIG. 7F, the length of conveyor 40 can be positioned with minimal distance between blow molding machine BMM 62, trimming finishing station TFS 20, leak detecting station LDS 34, and spout collapsing station SCS 36. This close positioning enables post mold manufacturing container 12 or 12*a* with flashing affixed, and having integral collapsible spout 16 or 16*a* formed in molded extended position 18, to be de-flashed, trimmed, leak detected, and integral collapsible spout 16 or 16*a* compressed from molded extended position 18, sufficiently quickly permitting utilization of the retained latent heat from the molding process for thermally pliable material 56, to be present when integral collapsible spout 16 or 16*a* is transformed from molded extended position 18, to fully collapsed position 32.

In various implementation examples, trimming finishing station TFS 20, operates using pneumatic or hydraulic cylinders to open and close trimming buckets or blocks split along mold parting line 58, having internal cutting edges 60 to match the profile of container 12 or 12*a*, handle 52, integral collapsible spout 16 or 16*a* formed in molded extended position 18, neck 14, supporting neck sealing surface 22, and container bottom 54 for removing flashing 10 and trimming to predefined specifications. Alternate implementation examples in FIG. 6A-FIG. 6E and FIG. 7A-FIG. 7F provide trimming, de-flashing and compression of integral collapsible spout 16 and 16*a* to fully collapsed position 32 by at least one human hand 38.

In other implementation examples, leak detecting station LDS 34 is present wherein leak detecting apparatus 24, engages leak detecting mandrel 50 with neck opening sealing surface 22, while container 12 or 12*a* have integral collapsible spout 16 or 16*a* in molded extended position 18, during the leak detecting process. Alternate embodiment examples implement a secondary leak detecting station LDS 34, subsequent to spout collapsing station SCS 36, when integral collapsible spout 16 or 16*a* have been transformed to fully collapsed position 32.

While various mechanical means for compressing integral collapsible spout 16 or 16*a* from molded extended position 18 to fully collapsed position 32 are possible; the implementation of spout collapsing station SCS 36, comprising: pneumatic cylinder 26, spout compression mandrel 28, 28*a* or 28*b* provides a repeatable solution and pilots integral collapsible spout 16 or 16*a* to a straight fully collapsed position 32 within acceptable planarity tolerances. The pounds of force required for collapsing integral collapsible spout 16 or 16*a* to fully collapsed position 32 depend on (a) cross-sectional wall thickness of integral collapsible spout 16 or 16*a*, and (b) integral collapsible spout temperature at the time of compression. During blow molding, the cross-sectional wall thickness of integral collapsible spout 16 or 16*a* can be increased or decreased depending on desired performance integrity required to meet respective packaged product compatibility for a container having an integral collapsible spout.

The hotter thermally pliable material 56 is during spout compression, the less force required to transform integral collapsible spout 16 or 16*a* to fully collapsed position 32. Pneumatic cylinder 26 should have sufficient ram stroke length corresponding to the overall length of integral collapsible spout 16 or 16*a* in molded extended position 18 and be capable of producing at least seventy-five-foot pounds of force to transform integral collapsible spout 16 or 16*a* to fully collapsed position 32. Generally, an air supply having 90-100 psi should be sufficient for operating respective pneumatic equipment.

It will be obvious to one skilled in the respective field of art if integral collapsible spout 16 or 16*a* does not have thermally pliable material 56 present during the spout collapsing process. This will be evident because either (a) integral collapsible spout 16 or 16*a* will not compress to predetermined fully collapsed position 32, or (b) the force required for compressing Integral collapsible spout 16 or 16*a* to fully collapsed position 32 will deform the upper containment body of container 12 or 12*a*.

The ambient air temperature in the manufacturing environment directly effects the cooling and timing in which integral collapsible spout 16 or 16*a* have before being transformed from molded extended position 18, to fully collapsed position 32. Thus, the speed of conveyor 40, combined with physical spacing and distance between blow molding machine 62, trimming finishing station 20, leak detecting station LDS 34, and spout collapsing station SCS 36 should be synchronized accordingly and positioned in close proximity to each other. This will provide an effective time window in utilizing the retained latent heat from the blow molding process, permitting integral collapsible spout 16 or 16*a* to be transformed from molded extended position 18 to fully collapsed position 32.

Figures 2A, 2B, 2C, 2D, 2E, 2F, 2G:
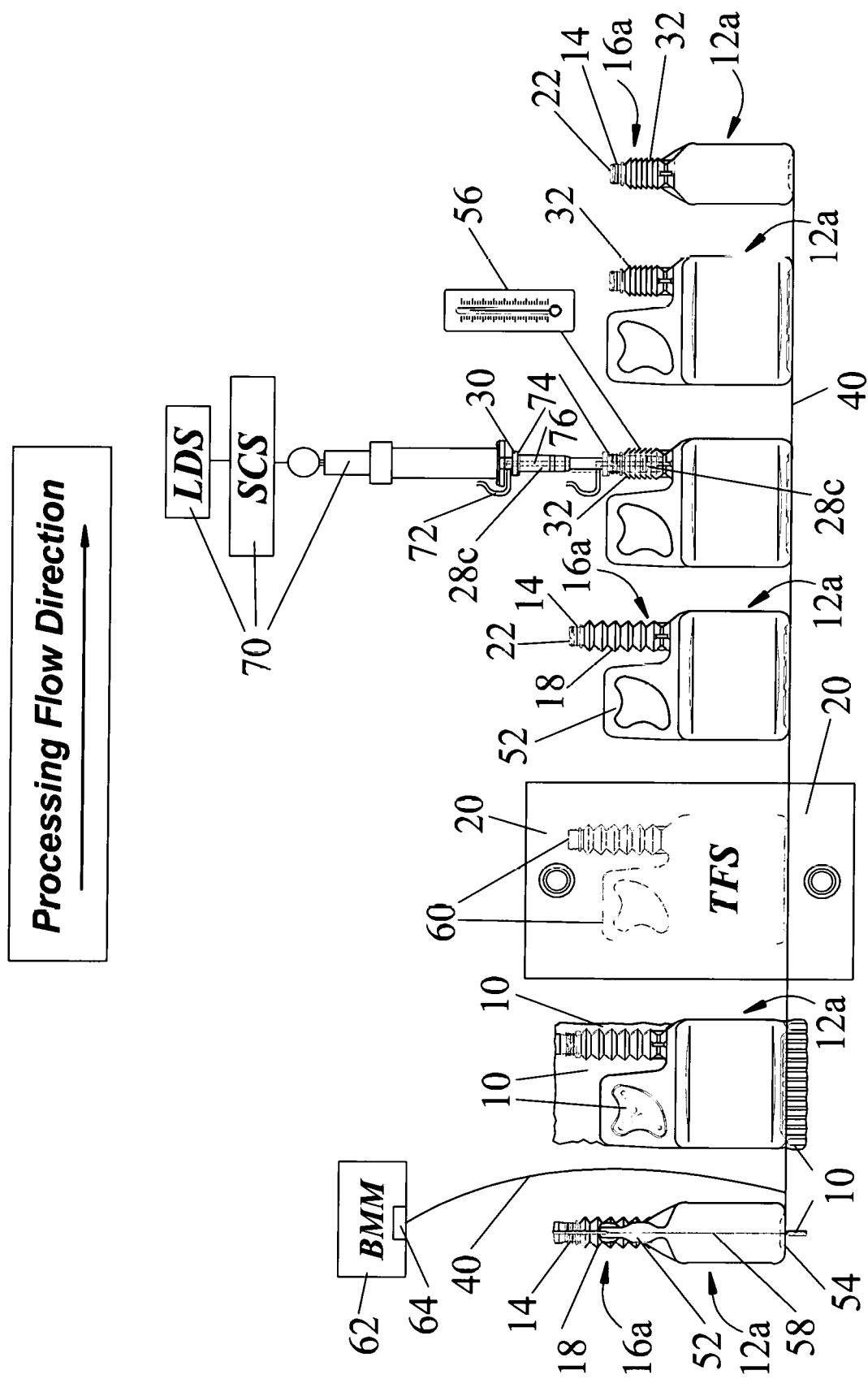
FIG. 2A illustrates a left end view of FIG. 2B where container can be transported from BMM blow molding machine according to an implementation of the invention.
FIG. 2B illustrates right side view of a container having an integral collapsible spout in the molded extended position with flashing and a handle according to an implementation of the invention.
FIG. 2C illustrates right side view of TFS trimming finishing station for removing flashing and trimming container to specifications according to an implementation of invention.
FIG. 2D illustrates right side view of a container having an integral collapsible spout in the molded extended position with a handle and flashing removed according to an implementation of the invention.
FIG. 2E illustrates right side view of container with thermally pliable material present at a dual purpose SCS spout collapsing station having integral LDS leak detecting station where container having an integral collapsible spout molded in extended position can be leak detected and subsequently compressed from molded extended position to fully collapsed position, and leak detected again in fully collapsed position according to an implementation of the invention.
FIG. 2F illustrates right side view of container having an integral collapsible spout in fully collapsed position according to an implementation of the invention.
FIG. 2G illustrates right end view of FIG. 2F container having an integral collapsible spout in fully collapsed position according to an implementation of the invention.

In another implementation, FIG. 2A-FIG. 2G shows spout collapsing station with integral leak detecting apparatus 70 in FIG. 2E, fitted with auxiliary leak detecting air supply 72, affixed to spout compression mandrel with air channel 28*c*, providing mandrel air passage 76, featuring neck sealing surface 74 affixed to spout compression mandrel shoulder 30, engaging neck opening sealing surface 22 for leak detecting while integral collapsible spout 16 or 16*a* is in molded extended position 18.

Here, the machine can be implemented to perform three processes at one station; (a) leak detecting with integral collapsible spout 16 or 16*a* in molded extended position 18, (b) compressing integral collapsible spout 16 or 16*a* to fully collapsed position 32, and (c) perform secondary leak detecting inspection when in fully collapsed position 32. The digital programing of logic controllers and synchronization of conveyor 40, and related equipment for spout collapsing station with integral leak detecting apparatus 70 is more advanced than independent spout collapsing station SCS 36, or leak detecting station LDS 34. However, it saves processing time and increases the tolerance window for utilization of retained latent heat from the blow molding process permitting integral collapsible spout 16 or 16*a* to transform to fully collapsed position 32.

In FIG. 8A-FIG. 8H, another implementation can be utilizing heating station HS 68 shown in FIG. 8D which provides more flexibility in positioning, spacing, and timing of respective post mold manufacturing equipment. Here, heating station HS 68 can be positioned after trimming finishing station 20 to reheat integral collapsible spout 16 or 16*a*, while in molded extended position 18 to provide thermally pliable material 56 for processing through spout collapsing station SCS 36, and/or SCS with integral LDS 70, transforming integral collapsible spout 16 or 16*a* to fully collapsed position 32. Typically, heating station HS 68 opens, closes, and operates using pneumatic cylinders similar to buckets or blocks on trimming finishing stations. The heating elements for these buckets can be positioned in the buckets or blocks parallel with the length of integral collapsible spout 16 or 16*a*, wherein the temperature can be adjusted to reheat integral collapsible spout 16 or 16*a* in respective timing to be in harmony with production line speeds of related equipment for optimum post mold manufacturing throughput. The implementation of heating station 68 increases the element of time window before cools 66 in post mold manufacturing container 12 or 12*a*, especially where manufacturing plants have cooler ambient air temperatures. Optional laser system LS 44 and vision system VS 46 may be implemented for inspecting planarity tolerances after integral collapsible spout 16 or 16*a* have been transformed to fully collapsed position 32.

While not shown in the drawings of this disclosure, another alternative spout collapsing station can utilize modified trimming buckets (without cutting edges) as retractable positioning mechanisms 42 to capture container 12 or 12*a* below the base of integral collapsible spout 16 or 16*a*, wherein a spout compression means as described herein may be implemented above these modified trimming buckets or blocks for compressing integral collapsible spout 16 or 16*a* to fully collapsed position 32.

It is to be understood that this invention is not limited to the specific devices, methods, conditions, or parameters described and/or shown herein, and that the terminology used herein is for the purpose of describing particular implementations and/or embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A method of post mold manufacturing a container having an integral collapsible spout molded in an extended position with flashing affixed to and surrounding said integral collapsible spout, comprising: providing said container to conveyor system utilizing digital programing of logic controllers and synchronization of said conveyor system moving said container from a blow molding machine to a trimming finishing station for removing said flashing and finishing said integral collapsible spout; further transporting said container with said flashing removed to a spout collapsing station, whereby said integral collapsible spout is compressed from said molded extended position while material of said integral collapsible spout is thermally pliable; permitting said integral collapsible spout to be transformed to a predetermined fully collapsed position.

2. The method of claim 1, wherein respective post mold manufacturing and processing equipment are providing adjustability in stop start speed, size, synchronization, geometrical positioning, and planarity for optimum throughput.

3. The method of claim 1, wherein said container is transported sufficiently quickly permitting utilization of retained latent heat from the blow molding process to be present when compressing said integral collapsible spout from said molded extended position, to said fully collapsed position.

4. The method of claim 1, wherein the material of said integral collapsible spout can be reheated to a thermally pliable state while in said molded extended position; permitting said integral collapsible spout to be transformed to said fully collapsed position.

5. The method of claim 1, wherein said spout collapsing station is comprising a mechanical mandrel to pilot said integral collapsible spout from said molded extended position to said fully collapsed position.

6. The method of claim 5, wherein said mechanical mandrel is dual purpose; comprising an air channel for leak detecting, and a mandrel shoulder for sequentially compressing said integral collapsible spout to said fully collapsed position.

* * * * *